M. C. BULLOCK.
GIB FOR CONNECTING RODS.
No. 247,534. Patented Sept. 27, 1881.
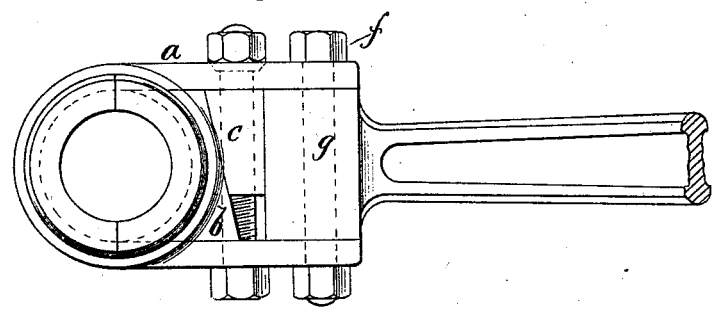
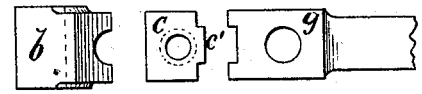
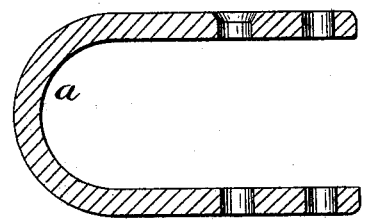
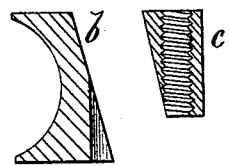
WITNESSES:
James H. Coyne
Wm. C. Whiting
INVENTOR:
Milan C. Bullock
BY Coyne and Elliott
ATTORNEYS.

UNITED STATES PATENT OFFICE.

MILAN C. BULLOCK, OF CHICAGO, ILLINOIS.

GIB FOR CONNECTING-RODS.

SPECIFICATION forming part of Letters Patent No. 247,534, dated September 27, 1881.

Application filed July 28, 1879.

*To all whom it may concern:*

Be it known that I, MILAN C. BULLOCK, of the city of Chicago, and county of Cook, and State of Illinois, have invented new and useful Improvements in Gibs for Connecting-Rods, of which the following is a specification.

My invention relates to gibs for securing the strap and brasses or bearings to a connecting-rod, in which an adjustable wedge-key is used for tightening and holding said parts in place.

Heretofore wedged keys for this purpose have been made adjustable or tightened by means of a set-screw passing through one side of the strap and pressing upon the base of the wedge; but owing to the fact that the end of the set-screw is subject to the entire upward pressure of the wedge-key, and that no means are provided for preventing the set-screws from working loose, the parts which the wedge is intended to hold soon become loosened from each other, and are not only worn out by their friction upon each other, but prevent an effective operation of the connecting-rod.

The object of my invention is to avoid the objections by providing means for tightening the wedge-key, so that the brasses or bearings, the strap, the gib, and the connecting-rod will be firmly and rigidly held together without a liability to become loosened by reason of a displacement of the wedge-key. I attain this object by mechanism illustrated in the accompanying drawings, in which—

Figure 1 is a side elevation of a connecting-rod embodying my invention; and Figs. 2 to and including Fig. 8, details, showing the various parts of the same detached.

Similar letters of reference indicate the several parts of the drawings.

The strap *a*, Fig. 2, and stub *g* of the connecting-rod *a'*, Fig. 7, are planed and fitted in the usual manner.

The gib or wedge-block *b*, Figs. 3 and 4, is fitted for entering the strap, and is squared or concaved on its forward face, which bears upon the brasses, and beveled or inclined upon its backward face to correspond with the wedge-key.

The wedge-key *c*, Figs. 5 and 6, is beveled upon its face next the wedge-block *b*, and is provided with a rib or projection, *c'*, upon its back face, for entering a groove or recess in the end of the stub *g*, to prevent a lateral movement of said wedge and to guide it in its vertical movement.

A screw or bolt, *d*, (see Fig. 8,) is threaded its entire length to fit the wedge-key *c* and to receive a nut, *e*, upon its end, which nut is beveled upon its under side to enter a corresponding countersink in the strap *a*, as indicated in dotted lines in Fig. 1, and by this means increase the friction between the nut *e* and strap *a* to prevent the nut from unscrewing and becoming loose.

The brasses may be made in two parts and held in place by dowel-pins in the strap and wedge-block *b*, respectively.

The wedge-key *c* is inserted in the strap behind the block *b*, and is held in the desired position by the screw *d*, which passes through the strap from side to side. By turning the screw *d* the wedge-key is moved upon the inclined face of the wedge-block, and thus serves to set upon the block in fitting the parts together.

Should the parts become worn, and consequently loosened, by continuous use, they may be tightened by partially unscrewing the nut *e* and then turning the screw *d* to force the wedge-key upon the inclined face of the wedge-block, after which the nut *e* is again screwed down. The nut *e* serves as a lock upon the bolt *d* and the wedge-key, which key is longitudinally screw-threaded to receive the bolt, as shown in Fig. 6, and thus prevents the bolt from working upon and loosening the wedge-key.

Stub *g* and strap *a* are held together by bolt *f*, which passes through them and is retained by nut, as shown in Fig. 1.

Among the advantages derived from the above-described construction is the rigidity of the various parts, the solidity of bearing afforded the brasses, the facilities for tightening the parts when worn, and the absence of any tendency of the wedge-key or the bolt which holds it to work upon each other when in use.

My device may be applied to the side rods of locomotives, and to other analogous devices, as well as to connecting-rods.

Having thus described my invention, what I claim, and desire to secure by Letters Patent, is—

1. The combination, with the strap $a$, and having a locking-nut, $e$, the gib $b$, and stub $g$, of the wedge-key $c$, longitudinally screw-threaded, and screw-threaded bolt $d$, fitting in said wedge-key and passing through the strap $a$, substantially as and for the purpose described.

2. The combination, with the strap, and having the locking-nut $e$, a gib, $b$, and stub $g$, of a longitudinally screw-threaded wedge-key provided with a rib engaged with a corresponding depression in the stub, and a screw-threaded bolt passing through said wedge-key and through the strap.

3. The combination, with the strap $a$ and the longitudinally screw-threaded wedge-key $c$, of a screw-threaded bolt, $d$, passing the strap and key, and provided with a countersunk locking-nut, $e$, engaging with said strap, as and for the purpose described.

MILAN C. BULLOCK.

Witnesses:
 B. C. WHITE,
 D. REMICK.